(12) United States Patent
McGough

(10) Patent No.: US 7,899,185 B2
(45) Date of Patent: Mar. 1, 2011

(54) REAL PRIVACY MANAGEMENT AUTHENTICATION SYSTEM

(76) Inventor: Paul McGough, Centreville, VA (US)

( * ) Notice: Subject to any disclaimer, the term of this patent is extended or adjusted under 35 U.S.C. 154(b) by 726 days.

(21) Appl. No.: 11/850,948

(22) Filed: Sep. 6, 2007

(65) Prior Publication Data

US 2008/0184031 A1    Jul. 31, 2008

Related U.S. Application Data

(60) Provisional application No. 60/842,595, filed on Sep. 6, 2006.

(51) Int. Cl.
H04L 9/00    (2006.01)
(52) U.S. Cl. .................................. 380/277; 380/278
(58) Field of Classification Search .............. 380/277, 380/278, 279, 280, 262; 705/51, 54, 57; 709/227–228; 713/156, 168, 175, 176, 150, 713/177
See application file for complete search history.

(56) References Cited

U.S. PATENT DOCUMENTS

| | | | | |
|---|---|---|---|---|
| 7,116,970 B2* | 10/2006 | Brusilovsky et al. | ........ | 455/411 |
| 7,142,676 B1* | 11/2006 | Hillier et al. | ................. | 380/278 |
| 7,143,436 B2* | 11/2006 | Yamaguchi et al. | ............. | 726/6 |
| 7,146,009 B2* | 12/2006 | Andivahis et al. | ............ | 380/277 |
| 7,275,158 B2* | 9/2007 | Akama | ........................ | 713/171 |
| 7,647,498 B2* | 1/2010 | Brown et al. | ................. | 713/168 |
| 7,778,422 B2* | 8/2010 | Freeman et al. | ............. | 380/278 |
| 2002/0087862 A1* | 7/2002 | Jain et al. | .................... | 713/176 |
| 2002/0112163 A1* | 8/2002 | Ireton | ......................... | 713/176 |
| 2002/0129238 A1* | 9/2002 | Toh et al. | ..................... | 713/153 |
| 2002/0131598 A1* | 9/2002 | Chiu | .......................... | 380/270 |
| 2003/0026430 A1* | 2/2003 | Aikawa et al. | ............... | 380/277 |
| 2004/0151317 A1* | 8/2004 | Hyyppa et al. | .............. | 380/277 |
| 2004/0151322 A1* | 8/2004 | Sovio et al. | .................. | 380/278 |
| 2004/0250073 A1* | 12/2004 | Cukier et al. | ................ | 713/171 |
| 2005/0129246 A1* | 6/2005 | Gearhart | ...................... | 380/278 |
| 2005/0169479 A1* | 8/2005 | Ekstrom | ...................... | 380/277 |
| 2005/0271211 A1* | 12/2005 | Takemura | .................... | 380/277 |
| 2006/0149704 A1* | 7/2006 | Wyatt et al. | ..................... | 707/2 |
| 2006/0171540 A1* | 8/2006 | Lee et al. | ..................... | 380/277 |
| 2006/0222180 A1* | 10/2006 | Elliott | ......................... | 380/263 |

(Continued)

OTHER PUBLICATIONS

The International Search Report and Written Opinion, mailed on Jul. 7, 2008, in related U.S. Appl. No. 11/850,948, filed Sep. 6, 2007.

(Continued)

*Primary Examiner* — Ponnoreay Pich
*Assistant Examiner* — Sayed Beheshti Shirazi
(74) *Attorney, Agent, or Firm* — Michael P. Fortkort; Michael P Fortkort PC

(57) ABSTRACT

A system for secure communications. An authentication procedure establishes a session key between communicating entities that is used to encrypt subsequent communications. The authentication procedure can be repeated for each n messages exchanged, where n is an integer, for each web page sent and received and for any other suitable interval. An entity can establish a trusted relationship with a directory server that can act as a trusted intermediary in authentication and session key set up between two or more entities that do not trust each other.

6 Claims, 3 Drawing Sheets

U.S. PATENT DOCUMENTS

| | | | |
|---|---|---|---|
| 2007/0053520 A1* | 3/2007 | Eckleder | 380/278 |
| 2007/0071243 A1* | 3/2007 | Nanda | 380/277 |
| 2007/0092083 A1* | 4/2007 | Young et al. | 380/278 |
| 2007/0124471 A1* | 5/2007 | Harada et al. | 709/225 |
| 2007/0127719 A1* | 6/2007 | Selander et al. | 380/277 |
| 2007/0258594 A1* | 11/2007 | Sandhu et al. | 380/277 |
| 2007/0280482 A1* | 12/2007 | Yan et al. | 380/278 |
| 2009/0006850 A1* | 1/2009 | Birger et al. | 713/169 |
| 2010/0211779 A1* | 8/2010 | Sundaram | 713/168 |
| 2010/0228980 A1* | 9/2010 | Falk et al. | 713/171 |

OTHER PUBLICATIONS

Chokhani, S. et al., Internet X.509 Public Key Infrastructure Certificate Policy and Certification Practices Framework, Network Working Group RFC 2527 (Mar. 1999).

Dierk, T. et al., The TLS Protocol Version 1.0, Network Working Group RFC 2246 (Jan. 1999).

Kangas, E., How Does Secure Socket Layer (SSL) Work?, LuxSci (Mar. 14, 2005).

Rescorla, E. et al., Datagram Transport Layer Security, Network Working Group RFC 4347 (Apr. 2006).

* cited by examiner

REAL PRIVACY MANAGEMENT AUTHENTICATION SYSTEM

CROSS-REFERENCES TO RELATED APPLICATIONS

This application claims the benefit under 35 U.S.C. 119(e) of United States Provisional Patent Application No. 60/842,595, entitled "Real Privacy Management Authentication System," filed on Sep. 6, 2006, which is incorporated herein by reference in its entirety.

BACKGROUND OF THE INVENTION

Internet communications architecture relies on HTTP traffic between web servers and web browsers. When the communications are deemed to have a security requirement, Secure Sockets Layer (SSL) is the de facto standard. An historical perspective provides the context that the initial offering of SSL was in response to the desire to use the Internet as a commerce system. SSL was developed and deployed as a commercial solution outside of any standards or best practices at the time. The attainment by SSL to the level of de facto standard, as well as post-introductory standardization of the technology and its follow-on, Transport Layer Security (TLS), has made clear that any new system of security for HTTP communications should deliver the same technical as well as ease-of-use capabilities.

What is needed is a way to meet and exceed the standards-based minimums of SSL/TLS, while solving outstanding performance, complexity and security problems. In particular, a better security scheme would have improved performance in terms of fewer steps and less computational effort to deliver a comparable level of security. A better protocol would be less complex, with simpler processing, less processing per step and a better end-user security experience. It would use less bandwidth by using less data and fewer transmissions. It would be scalable and capable of peer to peer trust instead of being limited to a hierarchical scheme. The security of a better scheme would include regular mutual authentication, with easily defined session lengths down to the individual message level for shorter key life. Ideally, a better protocol would employ provably secure mathematics.

DETAILED DESCRIPTION OF THE INVENTION

An embodiment of the present invention is called SSLNext (SSLX) and illustrates many of the features of the present invention. It is an application of the 2factor Real Privacy Management (RPM) mutual\authentication and data security technology for the web HTTP architecture. SSLX can be a direct and complete replacement of the current SSL/TLS process. It can deliver the same authentication and security features as SSL/TLS, maintain the same server configurations and operations and provide the same browser end-user experience and ease-of-use as SSL/TLS. At the same time, it can deliver substantial performance improvements, simplify authenticated connectivity (both trusted and cross-party verified operation) and limit security vulnerabilities.

SSLX can operate as a software component of a web server and within the software web browser application. The initial implementation of SSLX is available in the Apache web server and the Firefox web browsers, both as software modules/extensions of the open source code. SSLX can be made available to other web architecture software, operating identically across all platforms and applications.

Figure 1:
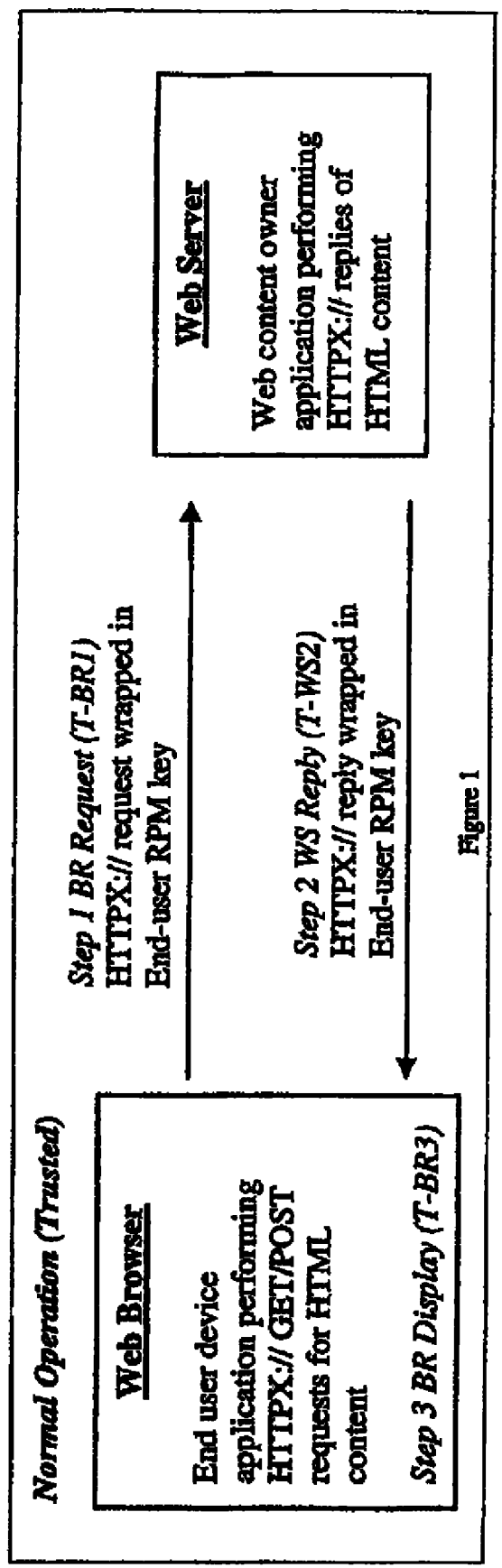
FIG. 1 shows the normal communications flow in accordance with an embodiment of the present invention.

FIG. 1 shows the normal communications flow for SSLX, which can be used when both the browser and the server share RPM Session Master Keys (SMKs). The browser can obtain the SMK by methods including:

1. Performing an SSLX Authentication Handshake; or
2. Performing an out of band process that entails the end-user authenticating to the server owner. The server creates and stores the key associated with this particular browser and the browser owner can enter the key into the browser application.

Referring to FIG. 1, a browser sends a GET/POST request to the web server wrapped in an RPM exchange (T-WS1).XX, i.e., encrypted using a SMK. The server replies using the same SMK to wrap reply content in an RPM exchange (T-WS2). The browser then unwraps the reply content and displays it to the user (T-BR2). Each and every message can be uniquely encrypted with a new SMK and delivered; or each round-trip (request and reply can be encrypted with the same SMK) can be uniquely encrypted. There is a setting on the server that defines an RPM session length. The session length can specify how many messages should be encrypted using the same SMK, or how often a new SMK should be generated for encrypting and decrypting messages. For example, the default setting for an SSLX session length can be one HTML page, so each page would have a unique SMK exchange and message key to include the request and reply of all the objects on that page.

At each session, the SSLX communications traffic is quite simple: the browser wraps each request in either an RPM key exchange and ciphertext (if session start) or just ciphertext (inside session) and sends it to the trusted server. The server either unwraps the RPM key exchange and decrypts the request, or simply decrypts the request, then processes the request to obtain the content, then wraps the reply in either an RPM key exchange (i.e., generates and sends a new SMK if session length is set for every communication) or it just generates a ciphertext reply using the session key (SMK) and returns it to the browser. The browser then unwraps the content, performing an RPM key exchange decrypt or just a cipher decrypt. The browser can render the decrypted content to a user.

As an embodiment of the present invention, SSLX always uses AES and advantageously avoids the wasted resources used by, for example, SSL in selecting a symmetric cryptographic algorithm for secure communications. Of course, any cryptographic scheme can be used by embodiments of the present invention, not just AES. SSLX employs modular code in the RPM APIs that can be easily replaced should the need arise.

Figure 2:
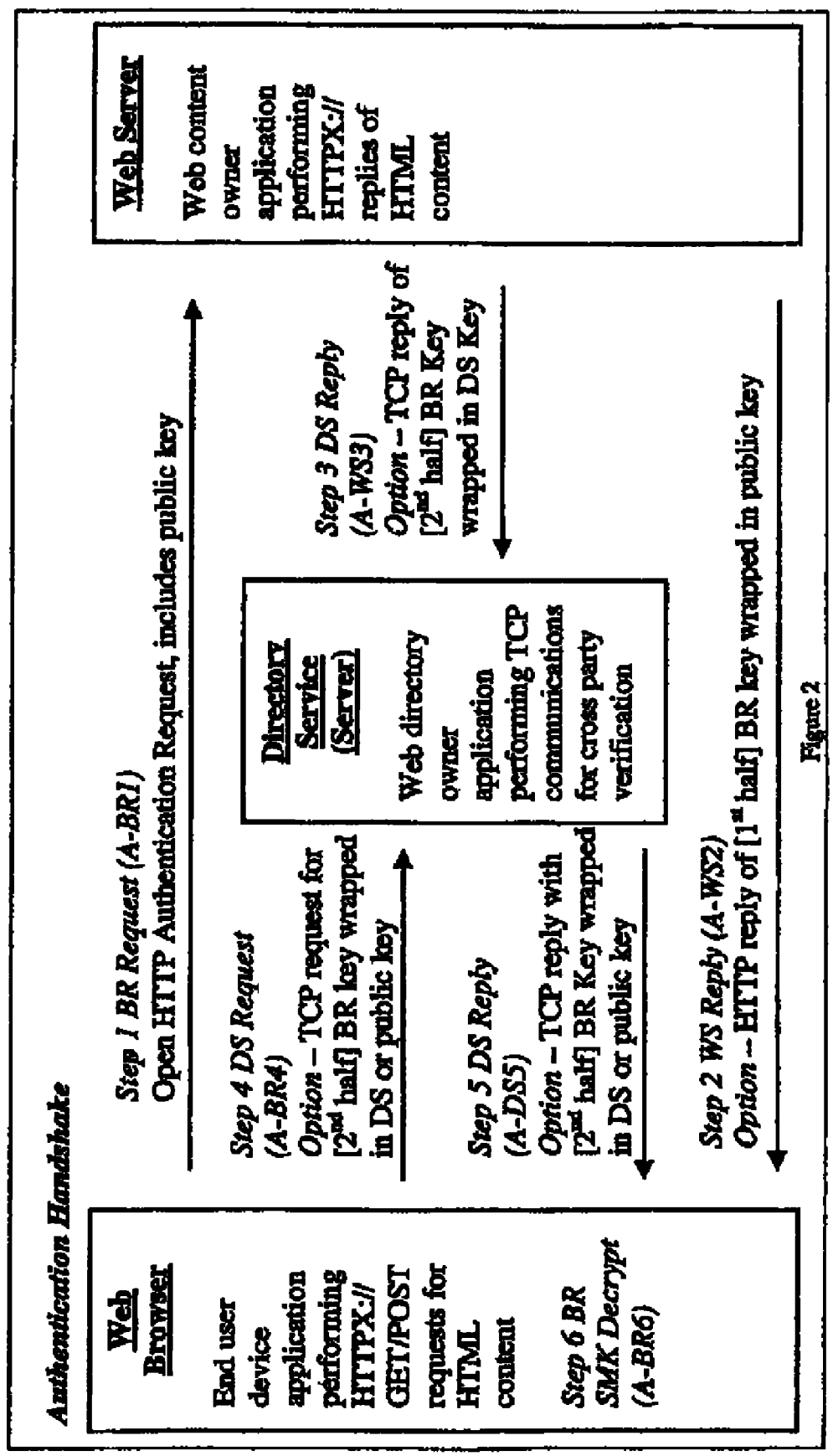
FIG. 2 shows an authentication handshake in accordance with an embodiment of the present invention.

FIG. 2 shows an authentication handshake (AH) in accordance with an embodiment of the present invention. A request is issued by the browser to the web server for a trusted RPM Session Master Key (SMK) to be wrapped in a browser public key (A-BR1). The corresponding private key is stored as a secret at the browser. The request can also have an Authentication Request value that determines which, and with what elements, of the following is performed. The web server can make two replies after generating the SMK for this browser. One reply can be sent directly back to the browser with the first half of the SMK encrypted using the browser's public key (A-WS2). Another reply can be made to the Directory Server (DS) with the second half of the SMK wrapped (encrypted) using the web server's DS key, which the web server received during a web server Verified Set Up (VSU) procedure (A-WS3), to be described in greater detail below. The browser can then send a request to the DS specified by the web server for the other half of the SMK wrapped in a DS key received by the browser during a browser VSU procedure to be described in greater detail below. The reply from the DS may be encrypted using a browser public key if the browser has either not performed a browser VSU with the sending DS, or if the browser has not verified with any DS. In such a case, the DS in communication with the browser may be a root, default or master DS called a Common Directory Server (CDS.) (A-BR4). The DS can relay the second half of the SMK back to the browser using the browser's DS or public key (A-DSS). The browser can then decrypt the SMK to then begin secure communications with the web server using Normal Operation (Trusted) (A-BR6) (see FIG. 1.)

A switch-based relay of the SMK through the DS is made to both speed up the process (no encryption/decryption need be done at the DS) and to assure both the server and the browser owner that the DS does not "know" the relayed half of the actual SMK. It would be possible to store the exchange and perform a decrypt, but even if this were done, it is only one half of the key, which would not be sufficient to decrypt messages encrypted with the whole SMK. Safeguards should be implemented to ensure that a DS does not store exchanges.

The manner in which the Security Level options are selected in the AH can be as follows: If the Security Level setting his High, the browser in its initial request can send to the server a list of DSs where the browser has performed a VSU along with a browser public key for the reply. If the setting is Medium, it can either send the list (if it has one) or send a blank list. If the setting is Low, then the browser can set a flag and tell the server to completely disregard using a DS and send back to the browser the authentication reply in total using the public key. The server can select a DS to use from a list received from the browser. If the list is blank, the server can defaults to using the CDS. If the flag is set for security level Low then the server can reply in total directly to the browser using the browser public key.

For Medium or High settings, the server can default to the CDS if the server's list of DSs with which the server has performed a server VSU does not match any of those in the browser DS list. As the server readies to reply to the browser, it can generates a DS identifier (DS ID) for this particular AH. Then the server can reply to the browser (e.g., using the browser public key) and specify to the browser the DS selected by the server for the transaction and include the transmission's DS ID. It can also include the pertinent first half of the Session Master Key (SMK.). The server can send to the selected DS the second half of the SMK, which can be encrypted by the server using its DS key for the selected DS. The server can always have a DS key to the CDS so the server-to-DS reply can always be RPM-encrypted.

When the browser receives the server reply, it unwraps the encrypted content using its private key. In a Low setting, the browser will process all of the content and the SMK is now shared and the browser and server are ready for Normal Operation. For Medium or High settings, the server reply can include the server-selected DS. If this DS is not what the browser expected (e.g., it wasn't in the DS list sent from the browser to the server) and the browser security level is set to High, a warning should appear. If it was in the list, then the request/reply to the DS will use the browser's DS RPM key (for High and Medium). If the setting is for Medium and the DS is not in the list (because it wasn't in the sent list or there was no list), then the browser can use its public key for the DS request/reply communication.

The following is a summary table of the Security Settings and resulting Options:

| Security Setting | Browser | Server | Browser |
|---|---|---|---|
| High | AH initial request includes DS list | Select from list where match; if no match use CDS | If not as expected, warning! If expected, use DS RPM key |
| Medium | AH initial request includes DS list or flag set to Medium (blank list) | Select from list where match; if no match use CDS or any VSUDS (log file notify of unknown DSs from list) | If match, use DS RPM key. If CDS or unknown DS, use public key to DS |
| Low | AH initial request includes flag set to Low | Reply directly to browser, no DS involved | Unwrap reply for SMK, no DS involved |

After an Authentication Handshake and a SMK is shared between the server and the browser, further message traffic between server and browser can be handled under Normal Operation (FIG. 1.)

Verified Set Up

The purpose of the Verified Set Up (VSU) is to establish a trusted relationship between two communicating entities. In SSLX, this can be between a server and a DS or between a browser and a DS. Every server should undergo a VSU with the Common Directory Server (CDS). This can establish a Medium baseline of security for the SSLX system without end user participation. The browser can also perform a VSU to the CDS, which can establish a High baseline of security for SSLX.

It can be advantageous to have some kind of human interaction to initially establish the authenticity of two entities in an electronic communication. In SSL, the process of obtaining a server certificate can be wide ranging across the different Certificate Authorities and is not standardized. In SSLX, there are various means of establishing authenticity offered. One entails minimal human interaction and another is automatic. In either SSLX method, there can be the opportunity to further verify authenticity by "double checking" in some other out-of-band method in addition to what is described here. For example, the two communicating entities can exchange authenticating information via telephone, mail or other personal interaction, e.g., between the server owner and the DS operator.

SSLX methods can include:

1. A public key exchange between the server (or browser) and the DS of the RPM key (Security Level Low)

2. An email exchange of the RPM key (Security Level Medium)

3. A combination of public key exchange and an email of two halves of the RPM key (Security Level High)

The operating code of an SSLX server and the browser can be set up to handle any of these methods automatically and/or with human interaction (e.g., cut and paste of key and other information into a form, typed entry of the key, etc.). While some might argue that both email and a public key interaction are susceptible to Man-In-The-Middle (MITM) attacks (whether used separately or together), it is important to remember that prior to Normal Operation, additional out-of-band checks can be made concerning the authenticity of the set up.

Figure 3:
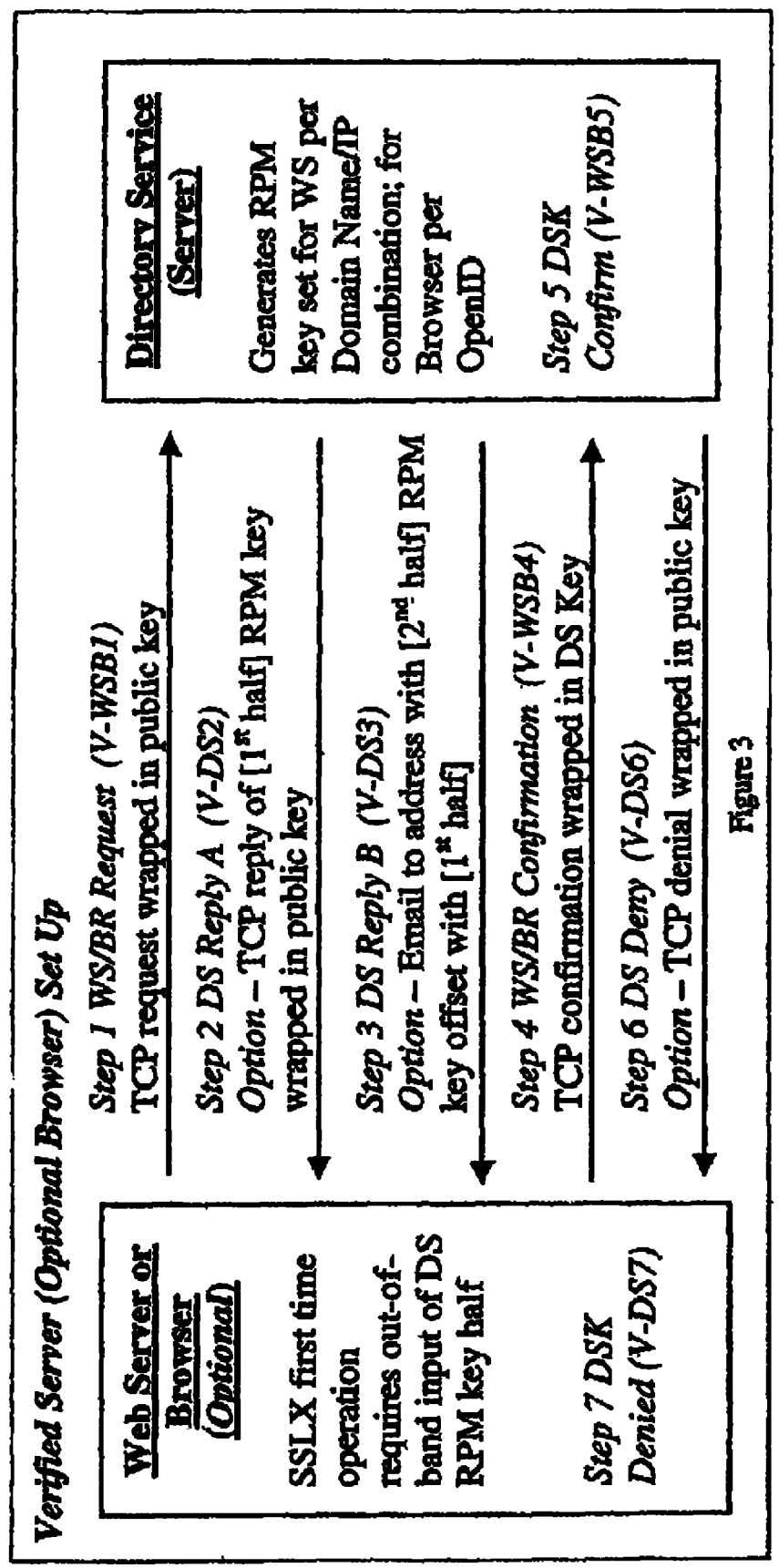
FIG. 3 shows a Verified Set Up in accordance with an embodiment of the present invention.

FIG. 3 shows a standard operation of the Verified Set Up for both browser and a server. The server or browser (the sender) communicating with the DS first creates a public/private key pair and sends a request to the DS for a trusted RPM DS Key (DSK) to be wrapped in (encrypted by) the sender's public key (V-WSB1). The request has an Authentication Request (AR) value that determines which, and with what elements, of the following is performed. If the AR value is for the public key option, the DS will make only a single reply with the entire DSK wrapped using the sent public key (V-DS2). If the AR value is for the email option, the DS will make a single reply with the entire DSK sent in an email to the email address specified in the AR (V-DS2). If the AR value is for a combination of both public key and email, the DS will make two replies after generating the DSK for the sender. The first reply can be sent from the DS directly back to the sender with the first half of the DSK wrapped using the sender's public key (V-DS2). The second reply can be sent in an email to the email address specified in the AR and include with the second half of the DSK offset by the first half (V-DS3).

The sender user interface can allow the input of the two halves of the DSK and the sender can store the DS DSK in the list of VSU DSs. To finalize the verification set up, a confirmation message can be sent to the DS wrapped in the new DSK (V-WSB4). The DS can use the DSK to decrypt the confirmation message (V-WSB5). If it is not confirmed (e.g., the sent values don't correspond to the calculated values), then the DS can send a "denied" message back to the browser/server wrapped in the public key (V-DS6). The browser/server can then decrypt the denied message, send a notification to the user and remove the DS from the VSU list (V-DS7).

After a Verified Set Up, the sender (server or browser) can maintain a list of these verified DSs, along with the associated DSKs, and can include information about verified DSs in Authentication Requests at SSLX-supported web sites.

The SSLX session flow is more efficient than the SSL flow in several ways. In SSLX, there is no certificate and AES is the default cipher module. Thus, none of the overhead associated with obtaining and verifying a certificate or selecting a symmetric cryptographic algorithm need be incurred with SSLX. In comparing the SSL and SSLX handshakes, the SSLX version has fewer steps and less computational overhead. In SSL, there is a version of the handshake that includes a browser certificate, and that makes the already complicated handshake even more so. There is no such step in SSLX. SSL allows for different servers to authenticate a same browser certificate through public Certificate Authorities (CAs), which also handle the public certificates for the server. But the incidence of public browser certificates is almost nonexistent in practice and the interoperability of browser certificates across different CAs can be suspect. The function of a CA in SSL can be replaced in SSLX with a Directory Service, which can be easier to maintain, implement and operate and can add the capability of handling, delivering and operating public browser SSLX keys.

The SSL handshake is computationally expensive. A digest of the signed messages in the SSL Hello sequence is calculated to compare with the browser submitted digest. The amount of information passed in these digests and certificates is also considerable (upwards of 3 KB). In comparison, the SSLX calculations are less than 10% of the computational effort and bandwidth requirement (256-bits). The last SSL session flow is the resumed session handshake. In SSL, this entails both the browser and the server caching the last SSL information to shorten the interaction. This is done a new handshake requires so much computational effort. SSLX does not need to replicate this flow, because even a resumed session SSL handshake takes more effort than a simple new SSLX Authentication Handshake. SSL resumed session handshake caches can be a serious security liability, whereas a new SSLX AH is not. Indeed, security in SSLX can be more flexible and stronger than in SSL. For example, SSL authentication and key set up occurs only once per session, i.e., in the SSL handshake. In an SSLX session, authentication and key set up can occur as frequently as once for each transmission.

SSLX matches several benefits of SSL. The end user can simply opens a browser, and upon requesting a secure connection, they can get one. The web site owner can simply install a web server that supports secure connections and can obtain one by performing one step. The connections provide both authentication and data security (encryption.)

SSLX improves upon SSL because the calculation efficiency of the underlying RPM key exchange for authentication can be over 100 times faster than a Diffie-Hellman key exchange. The end user can select a simple High/Medium/Low level of security for their connections, which delivers unique interaction specifics for their communications. Further, there is no "expertism" required for things like checking certificate validity dates, and knowing what a Certificate Revocation List is, etc. Web server initiation of secure capability in SSLX is tremendously simplified. The process for establishing third party trust is easier, less costly and simpler to understand and maintain, e.g., using the DS VSU. The number of steps to perform an SSLX session is reduced by 30%. An SSLX handshake realizes a 50% reduction in number of steps over the SSL handshake. Third Party trust can be performed in real-time, and can be faster and more secure than using a certificate digest as in SSL. Third Party trust is not hierarchical, nor does it require "authority. It can be peer to peer and a use simple authentic switch (a DS.) This enables scalability and federated trust. There are no certificate costs for SSLX. The cost of hardware support is also substantially reduced. There are fewer data elements in an SSLX authenticated key exchange, and the size of such exchanges can be reduced by 90% over SSL. Furthermore, there are fewer transmissions per participant interaction. Security is improved in two distinct ways: authentication of every session (down to the transmission of individual messages instead of once per connection) and the real-time use of authentic switches (DSs, instead of embedded certificate lists.) Also, the SSLX RPM key exchange has a mathematically provable foundation and is at least as secure as public key methods.

SSLX performs so much better than SSL that it is possible for content owners to have every web page secure for all web communications not just sensitive, personal information pages like payment or banking. The Internet is based on federated, not hierarchical trust. The phone system is also, and so it is with every global interconnected network. SSLX enables cross-domain DS networking based on growing and changing business requirements, not technological imposition. Businesses can choose how to connect third party trust in a DS P2P network instead of CA hierarchies of imposed root authorities; they no longer have to live with partners they don't necessarily want or need.

Other improvements in SSLX over SSL include a smaller code size of the RPM engine as compared to a PKI system. Also, the key sizes are substantially smaller and easier to work with. RPM keys can be lengthened a byte at a time and need not be doubled, like the public keys used with SSL.

Normal Operation

A browser RPM Session Master Key (SMK), if obtained from Authentication Handshake, is associated with an OpenID, which is a unique identifier for a given session at a given server. If the SMK is obtained from the data owner for secure access to a specific domain, it can be obtained through an out-of-band authenticated process with a trusted server owner. For an example, an employee can send an email to an administrator with pertinent authentication information (employee number, etc.) and the administrator can replying by sending the SMK in an email to the employee. The email can also include a permanent OpenID. For example, the server can randomly create an ID3 value for each authenticated and accepted user. The ID3 value can be stored, along with an assigned OpenID, at the server's Key Distribution Center (KDC). The ID3 value, OpenID and Domain can be returned to the browser owner in the desired out of band method. These credentials may be manually entered into a browser interface. For example, the browser may provide to the user a menu option to add or edit credentials. The user can cut and paste or manually enter via a keyboard an OpenID and Domain. In some embodiments, this information may be protected using, for example, a PIN. The user can enter the PIN and X=MOD16(PIN,SMK) can be calculated. X may be stored in a text file, such as a cookie.

The session length may be specified. The server can establish a setting for the session length, for example, using the following values:
0 (default)=one HTML page
1=every request
2=every request/reply round trip
3=on first page (initial request to server)
4=every 5 requests
5=every 10 requests
6=every n requests As shown in FIG. 1, a GET/POST browser request for an HTTPX:// web address can operate as follows:
1) Get RPM SMK and OpenID
   a) Look up the stored browser SMK
   b) If it exists, is it PIN protected? This can be established, for example, by setting a 1 on the first digit of a cookie=Yes, and setting 0=No.
      i) If Yes, then provide a form to the user through which he may enter his PIN
         A) Upon PIN entry, open the key file, read the key and MOD16(PIN, key-encrypted), and read the result into memory
      ii) If No, then open the key file and read the key into memory
   c) If no key exists, then perform an Authentication Handshake, use the resulting SMK
2) Get Request text
3) If start of RPM session,
   a) Perform an RPM KGPS
   b) Send KGPS output in HTTPX to server
4) Else if inside RPM session,
   a) Perform a cipher encrypt using session RPM message key on request plaintext
   b) Send OpenID, ciphertext in HTTPX to server As further shown in FIG. 1, step 2 (T-WS2) an HTTPX Reply can operate as follows:
1) Get Browser's SMK based on request OpenID;
   a) If was created during an Authentication Handshake, then the SMK is stored in the local memory/immediate area
   b) If OpenID was not just created in an Authentication Handshake, this is either a file lookup for file-based KDC, or a Database lookup for DB KDC
2) If start of RPM session,
   a) Perform RPM KGPR
   b) Process decrypted browser request, obtaining requested content
   c) Perform RPM KGPS where content is the plaintext
   d) Send KGPS output in HTTPX back to browser
3) Else if inside RPM session,
   a) Perform cipher decrypt using RPM message key
   b) Process decrypted browser request, obtaining requested content
   c) Perform cipher encrypt using RPM message key on content
   d) Send OpenID, ciphertext in HTTPX to browser As shown in FIG. 1, Step 3 (T-BR3) the browser may receive content as follows:
1) If this is a receipt of a newly started RPM session (session length=1),
   a) Perform RPM KGPR
2) Else if inside an RPM session (session length≠1),
   a) Perform cipher decrypt using current RPM message key
3) Process decrypted server content, obtaining HTML text, graphics or any other form of data as appropriate
4) Process HTML in browser and display to user For a key update for browser and server versions in permanent Trusted mode (non-AH operation):
1) As SSLX is intended to leverage HTTP's statelessness (as opposed to SSL, which does not), each session would necessitate obtaining the key from the KDC. But this operating condition could place unnecessary load (and consequent delay) on the server. As such, the server may be configured to hold an array of OpenIDs and their associated RPM keys in memory. There can also be a "logout" or "session end" message sent from the browser to the server upon either an application close or address bar request outside of the server's domain to release the key from server memory.
2) As SLLX will be using the unchained RPM method, in which ID1 and ID2 are fashioned on the fly from a "static" ID3 value, it is pertinent to the security model to update ID3 at some interval.
   a) Upon reaching the metric equal to the configuration setting in the server for ID3 Update (e.g., a number of messages, a random time value, etc.), perform a key update as per the "Key Update Note" in the KGPS/KGPR
   b) Hold the new ID3 value until both server and browser confirm they have it, then update the key in the browser (using PIN if opted) and update the server KDC Authentication Handshake (AH)

As shown in FIG. 2, Step 1 (A-BR1) the browser can initiate the exchange with the web server.
1) Create Public/Private key pair
   a) Select shortest/fastest/most secure method of public/private key pair generation and generate a key pair. Elliptic Curve Cryptography (ECC) as known in the art would be a good choice for implementing this step.
   b) For best security practice, generate per AH. The pair should not be stored or reused for subsequent use.

2) Send Authentication Request (AR) in HTTPX:// call to web server
    a) Send Security Setting Flag code, optional public key, optional VSU DS list (DS ID:DS IP Address) to web server (Security Setting Flag code is a setting in the Browser Configuration. It can be set initially upon browser set up to some default value, e.g., to Medium (setting=3))
    b) Security Setting Flag (SSF) codes where:
        i) 0 (High)=key halves sent to BR and through Verified Set Up (VSU) DSs
            A) VSU list (possibly includes CDS), public key included
        ii) 1 (High)=DS Only. The entire key can be sent through VSU DS, e.g., no public key; rather, a pre-registered DS Key exists at specific VSU.
            A) Specific DS, OpenID included
    c) 2 (Medium)=DS Only. Entire key sent through DS (optional VSU DS list or just a DS list, or no list)
        i) Public key included
    d) 3 (Medium)=(e.g., default), key halves sent to BR and through a DS;
        i) Public key included and optional VSU DS list, or just a DS list or no list)
    e) 4 (Low)=BR Only. Entire key sent back to Browser (no DS)
        i) Public key included
3) DS ID is a 32-digit random hex number that identifies the request ID that will be found and replied to in the DS
4) DS IP is the public IP address of one of browser's Directory Services (VSU)
5) Domain Name is a public HTTP designation, e.g., www.2factor.com The web server reply to the browser based on AR, SSF can operate as follows (see FIG. 2, Step 2, A-WS2):

1) If SSF=0
    a) Generate browser SMK (ID3,256-bits), OpenID
    b) Select matching VSU from browser list, get DS key (DSK)
        i) IF NO MATCH, reply (wrapped using public key) with SSLX Error # "No VSU Match—cannot process High Security, Code 0"
            A) If Browser sends SSLX Error Reply # "Downgrade acceptable", then reply as if SSF=3 using CDS DSK; if that fails, try SSF=4
        ii) Generate log text file entry (if no file, create; if exists, append) of DS info (DS IP)
    c) Generate DS ID
    d) Reply with first half (32-digits, 128-bits) of SMK, DS ID, DS IP, Domain Name, OpenID wrapped in public key (using any suitable public key encryption methods)
    e) Perform Step 3 to selected DS, using DS DSK and sending the browser's OpenID, the DS ID and second half of SMK
2) If SSF=1
    a) Generate browser SMK
    b) Select VSU DS from browser, get DS key (DSK)
        i) IF NO MATCH, reply (wrapped using public key) with SSLX Error # "No VSU Match—cannot process High Security, Code 1"
            A) Browser's option on this error is to resubmit AH using a different SSF code (because there is no return to the browser to know where to go pick up the DS ID if not an agreed-upon DS)
        ii) Generate log text file entry (if no file, create; if exists, append) of DS info (DS IP)
    c) Generate DS ID
    d) Perform Step 3 to specific DS, using DS DSK and sending the browser's OpenID, DS ID, Domain Name and whole SMK
3) If SSF=2
    a) Generate browser SMK, OpenID
    b) Select matching VSU DS from browser list (if list), or any DS (if list), or use CDS if no list—get DS key (DSK) (this will at least be a CDS DSK)
        i) There should not be any error, as one can use lowest common denominator of CDS
        ii) Generate log text file entry (if no file exists, then create one; if it exists, then append to it) of DS info (DS IP) that is not in the server's VSU list
    c) Generate DS ID
    d) Reply with DS ID, DS IP, Domain Name, OpenID wrapped in public key
    e) Perform Step 3 to selected DS, using DS DSK and sending browser's OpenID, DS ID and the whole SMK
4) If SSF=3 (e.g., default)
    a) Generate browser SMK, OpenID
    b) Select matching VSU DS from browser list (if list), or any DS (if list), or use CDS if no list. Get DS key (DSK) (will at least be a CDS DSK)
        i) There should not be any error, as one can use lowest common denominator of CDS
        ii) Generate log text file entry (if no file, create; if exists, append) of DS info (DS IP) not in the server's VSU list
    c) Generate DS ID
    d) Reply with first half (e.g., 32-digits, 128-bits) of SMK, DS ID, DS IP, Domain Name, OpenID wrapped in public key
    e) Perform Step 3 to selected DS, using DS DSK and sending the browser's OpenID, the DS ID and 2nd half of SMK
5) If SSF=4
    a) Generate browser SMK, OpenID
    b) Perform Step 5 (FIG. 2), sending Domain Name, OpenID, whole SMK back to the browser, wrapped in public key In some embodiments of the present invention, the server may reply to Directory Service/Server (see FIG. 2, Step 3, A-WS3). Since the server has undergone a Verified Set Up (e.g., to the CDS), then there is a DS Key (DSK.) This step is called with the DS ID and DS IP as parameters (from SSF return), e.g., using the CDS.

1) If SSF=0
    a) Send OpenID, DS ID and the second half of SMK
        i) Perform RPM key exchange using DSK, create new message key
        ii) Use message key in Mod16 RPM call to encrypt the second half of the SMK
        iii) Use message key in Mod16 RPM call to encrypt DS ID
        iv) Reply to DS's IP w/RPM output, the browser's OpenID and ciphertext of SMK, DS ID. In this embodiment, this OpenID is not the RPM output OpenID of the server. Rather, it is the expected browser's OpenID.
2) If SSF=1
    a) Send OpenID, DS ID and whole SMK
        i) Perform RPM key exchange using DSK, create new message key ii) Use message key in Mod16 RPM call to SMK
iii) Use message key in Mod16 RPM call to encrypt DS ID
iv) Reply to DS's IP with RPM output, the browser's OpenID and ciphertext of SMK, DS ID
3) If SSF=2
   a) Send OpenID, DS ID and whole SMK
      i) Perform RPM key exchange using DSK, create new message key
      ii) Use message key in Mod16 RPM call to encrypt SMK
      iii) Use message key in Mod16 RPM call to encrypt DS ID
      iv) Reply to DS's IP w/RPM output, the browser's OpenID and ciphertext of SMK, DS ID
4) If SSF=3
   a) Send OpenID, DS ID and the second half of the SMK
      i) Perform RPM key exchange using DSK, create new message key
      ii) Use message key in Mod16 RPM call to encrypt 2nd half of SMK
      iii) Use message key in Mod16 RPM call to encrypt DS ID
      iv) Reply to DSs IP w/RPM output, the browser's OpenID and ciphertext of SMK, DS ID
5) If SSF=4, then skip this step In some embodiments of the present invention, there can be a browser request to Directory Service/Server (see FIG. 2, Step 4, A-BR4). Either the browser has gone through Verified Set Up and has a DS DSK, or the DS will be given the browser's public key for the reply. This step can be called with the DS ID and DS IP as parameters (from SSF return), or using the CDS. The browser can know the DS IP as a default, and have the OpenID as the record look up.

1) If SSF=0
   a) Send a DS Request (DSR) using DSK to the specified DS IP providing OpenID, DS ID asking for 2nd half of SMK, Domain Name
2) If SSF=1
   a) Send a DSR to the specified DS IP using DSK providing OpenID (browser doesn't know DS ID), asking for whole SMK, Domain Name
3) If SSF=2
   a) Send a DSR to the specified DS IP using DSK (if there was a list and there is a DSK) or public key, providing OpenID, DS ID asking for the whole SMK, Domain Name
4) If SSF=3
   a) Send a DSR to the specified DS EP using DSK (if there was a list and there is a DSK) or public key, providing OpenID, DS ID asking for second half of SMK, Domain Name
5) If SSF=4, then skip this step In some embodiments of the present invention, there can be a Directory Service or Server reply to the browser (see FIG. 2, Step 5, A-DS5). If SSF=4, this step is not performed. The browser has submitted a DS Request (DSR) using either a DSK or a public key for the reply 1) If DSR sent using a DSK, then there will be an OpenID
   a) Use OpenID to get correct DSK for this browser
   b) If DS ID provided, use it to get correct SMK for this browser session; if not provided, then use OpenID to get correct SMK
   c) Perform an RPM Key exchange using the DSK and reveal the message key
   d) Use message key in AES decrypt to reveal request (this can authenticate the browser)
      i) If SSF=0
         A) Perform RPM key exchange using DSK, create new message key
         B) Use message key in Mod16 RPM call to encrypt the second half of the SMK
         C) Reply to browser's IP with RPM output, ciphertext of SMK and Domain Name of server
      ii) If SSF=1
         A) Perform RPM key exchange using DSK, create new message key
         B) Use message key in Mod16 RPM call to encrypt the whole SMK
         C) Reply to browser's IP with RPM output, ciphertext of SMK and Domain Name of server
      iii) If SSF=2
         A) Perform RPM key exchange using DSK, create new message key
         B) Use message key in Mod16 RPM call to encrypt whole SMK
         C) Reply to browser's IP with RPM output, ciphertext of SMK and Domain Name of server
      iv) If SSF=3
         A) Perform RPM key exchange using DSK, create new message key
         B) Use message key in Mod16 RPM call to encrypt second half of SMK
         C) Reply to browser's IP with RPM output, ciphertext of SMK and Domain Name of server
   e) If DSR sent using browser's public key, then there will be a DS ID (and OpenID)
      i) Use DS ID to get correct SMK for this browser session
         A) If SSF=2
            1) Encrypt whole SMK using public key
            2) Reply to browser's IP with public key ciphertext of SMK and Domain Name of server
         B) If SSF=3
            1) Encrypt second half of SMK using public key
            2) Reply to browser's IP with public key ciphertext of SMK and Domain name of server 2) Browser decrypt of content (see FIG. 2, Step 6, A-BR5)
   a) If SSF=0
      i) Perform an RPM Key exchange using the DSK and reveal the message key
      ii) Check Domain Name from server against domain name from DS. If same, then continue. Else, stop and warn user.
      iii) Use message key in Mod16D decrypt to reveal second half of SMK (authenticates DS)
      iv) Concatenate first half and second half of SMK, making it whole
      v) Use SMK in Normal Operations
   b) If SSF=L
      i) Perform an RPM Key exchange using the DSK and reveal the message key
      ii) Check Domain Name from server against domain name from DS. If same continue, else stop and warn user.
      iii) Use message key in Mod16D decrypt to reveal whole SMK (authenticates DS)
      iv) Use SMK in Normal Operations
   c) If SSF=2
      i) If DSR sent using a DSK, then
         A) Perform a RPM Key exchange using the DSK and reveal message key B) Check Domain Name from server against domain name from DS. If same continue, else stop and warn user.
C) Use message key in Mod16D decrypt to reveal SMK (authenticates DS)
D) Use SMK in Normal Operations
ii) Else if DSR sent using public key
A) Perform decrypt using public key to reveal whole SMK, Domain Name
B) Check Domain Name from server against domain name from DS. If same continue, else stop and warn user.
C) Use SMK in Normal Operations
d) If SSF=3
i) If DSR sent using a DSK, then
A) Perform a RPM Key exchange using the DSK and reveal message key
B) Check Domain Name from server against domain name from DS. If same continue, else stop and warn user.
C) Use message key in Mod16D decrypt to reveal the second half of the SMK (authenticates DS)
D) Concatenate the first half and the second half of the SMK, making it whole
E) Use SMK in Normal Operations
ii) Else if DSR sent using public key
A) Perform decrypt using public key to reveal second half of SMK, Domain Name
B) Check Domain Name from server against domain name from DS. If same continue, else stop and warn user.
C) Concatenate the first half and second half of the SMK, making it whole.
D) Use SMK in Normal Operations.
e) If SSF=4
i) Server reply sent using public key
A) Perform decrypt using public key to reveal whole SMK, Domain Name
B) Check Domain Name from server against domain in address bar. If same continue, else stop and warn user.
C) Use SMK in Normal Operations In some embodiments, the server and/or the browser may perform a Verified Set Up (VSU). For the browser, the user can initiate VSU by selecting a menu option to specify the Directory Service or Server (See FIG. 3, Step 1, V-WSB1). For the server, it can initiate VSU on applet/extension execution (FIG. 3, Step 1, V-WSB1). The remaining flow can include:
1) Create Public/Private key pair
a) Select shortest/fastest/most secure method of public/private key pair generation and generate key pair (e.g., using Elliptic Curve Cryptography)
b) For best security practice, generate a pair for each VSU. The key pair for one VSU should not normally be stored for reuse with another VSU.
2) Send VSU Request (VSUR) in a TCP call to DS
a) Send DS Flag code, Domain Name (server only), optional public key, optional email address to DS
b) Browser: DS Flag code is a setting in the Browser Configuration. This can be set initially on browser set up to High (#0), which can be the default. No Domain Name is required for browser
c) Server: The method of operation should be High. VSU can occur on the initial startup of server to connect with CDS. Having a server domain name can be a requirement.
i) DS Flag (DSF) codes where:
A) 0 (High)=key halves sent through email and through DS. Public key, email address, Domain Name can be included.
B) 1 (Medium)=Email Only. The entire key can be sent through email. The email address and domain name can be included.
C) 2 (Low)=DS Only. The entire key can be sent through DS (no email). The public key and domain name can be included.
ii) The email address can be a public POP address FIG. 3, Step 2 (V-DS2) shows a reply to the browser or server. If DSF=1, this step is not performed. The browser or server has submitted a VSUR using a public key for the reply.
1) Generate OpenID, DSK for entity (browser or server)
a) If DSF=0
i) Reply with first half (32 digits, 128-bits) of DSK, OpenID, wrapped in public key
ii) Perform Step 3 by sending information to an email address, using public key and sending the second half of DSK offset (MOD16 encrypted) by first half
b) If DSF=2
i) Reply with whole DSK, OpenID wrapped in public key.

A Directory Service/Server reply is shown in FIG. 3, Step 3. (V-DS3). If DSF=2, this step is not performed. The browser or server has submitted a VSUR using a public key for the reply.
1) Generate OpenID, DSK for entity (browser or server), if not already done in FIG. 3, Step 2.
a) If DSF=0
i) Reply with second half (32 digits, 128-bits) of DSK Mod16 encrypted with the first half of DSK, OpenID to email address
b) If DSF=1
i) Reply with whole DSK, OpenID in message to email address A browser/server decrypt of a reply and confirmation is shown in FIG. 3, step 4 (V-WSB4).
1) If DSF=0
a) Perform decrypt using public key to reveal the first half of DSK
b) Open email message to reveal second half of DSK
c) Open Applet for key entry
i) Enter both halves, and OpenID, into applet fields. A user can be provided with a form for the manual entry of OpenID, the first and second halves of the DSK, the full DSK, etc., as appropriate to the protocol being implemented.
ii) The user may click a button onscreen that reads, "Plug In Key" that indicates that the user has finished entering the necessary information about DSK
A) Applet will take the second half of the DSK and perform a MOD16D using the first half to reveal the correct second half
B) Concatenate the first half and the second half of the DSK, making it whole
C) Insert into use (store DSK, OpenID in cookie, file, database, RAM, etc.) Such stored SDKs can be the VSU DSs for the list submission in an AH protocol.
2) If DSF=1
a) Open email message in specified email mailbox
b) Open Applet for key entry
i) Enter the full DSK and OpenID, into applet fields (e.g., manually, using cut and paste, etc.)

ii) Click button for "Plug In Key" (or some other appropriate user interface text)
   A) Applet will insert into use (store DSK, OpenID in cookie, file, database, RAM, etc.) Such SDKs can be the VSU DSs for the list submission in an AH protocol.
3) If DSF=2
   a) Perform decrypt using public key to reveal the first half of the DSK
   b) Open an email message to reveal the second half of the DSK
   c) Open Applet for key entry
      i) Enter both halves, and OpenID, into applet fields (there can be a form for the entry of OpenID, DSK first half, DSK second half, full DSK, etc., as appropriate
      ii) Click button labeled "Plug In Key" to indicate that the necessary DSK information has been entered.
         A) Applet will take the second half of the DSK and perform a MOD16D using the first half of DSK to reveal correct second half of DSK
         B) Concatenate the first half and the second half of the DSK, making it whole
         C) Insert into use (store DSK, OpenID in cookie, file, database, RAM, etc.) These can be the VSU DSs for the list submission in an AH protocol.
4) Reply to DS in TCP with Confirmation message
   a) Perform RPM key exchange using DSK, getting the message key
   b) Use the message key and AES to encrypt a confirmation message
      i) The message format can be: "[OpenID] DS VSU ready"
   c) Send RPM output (OpenID, OR) and ciphertext to DS FIG. 3, step 5 (V-WSB5) shows a DS decrypt of a confirmation message. For all DSF values (0, 1, 2):
1) Perform an RPM Key exchange using the DSK (found by sent OpenID) and reveal the message key
2) Use message key in AES to decrypt confirmation
3) If OpenID in message matches OpenID in header, confirmation
   a) If not, send "Deny" message, which the browser/server only receives if denied
   b) If yes, then store domain name, IP Address, OpenID, DSK FIG. 3, step 6 (V-DS6) shows a DS deny message. If the browser or server receives a DS Deny message, then the DSK is not correct, and the VSU process has failed. The DS Deny message can be sent wrapped in the public key. The message format can be: "[OpenID] DS VSU failed"

The recipient can decrypt the public key-encrypted DS Deny message to reveal the contents of the message.

FIG. 3, step 7 (V-DS7) shows a Web server or browser deleting stored DSK and OpenID information. The user can be notified of a failed VSU.

Embodiments of the present invention can be used to secure communications between any devices, including devices hosting browsers, server devices, peer to peer devices, handheld devices such as cellular telephones, personal computers, etc. Each such device can have a processor coupled to memory and a network. The processor can be a general purpose microprocessor or an Application Specific Integrated Circuit (ASIC). An example of an ASIC is a signal processor. An ASIC can embody at least a part of the method in accordance with the present invention in hardware and/or firmware. Memory can be any device adapted to store electronic information, such as RAM, flash memory, a hard disk, ROM, etc. Memory can store instructions adapted to be executed by the processor to perform at least part of the method in accordance with an embodiment of the present invention.

A system in accordance with the present invention can include a key request processing module adapted to receive an authentication request. The key request module can include a session key generation module that can generate a session key based upon information in a key request that is processed by the key request module. For example, the session key generation module can generate a session key and break it into two or more parts for distribution based upon the value of the session security flag in the key request processed by the key request module. A session key encryption module can receive as input the one or more parts of the session key received from the session key generation module and apply the appropriate encryption to the one or more parts of the key. This can also be based upon input from the key request processing module that in turn is based upon the contents of the key request. For example, if the key request includes a public key of the requester, the key encryption module can encrypt one or more parts of the generated key with the public key. Likewise, if the security setting flag indicates that a directory server is to be used, a directory server key can be used to encrypt one or more parts of the session key. A session key routing module can address and send one or more parts of the encrypted session key from the session key generation module to the appropriate destination, which may be determined based upon information in the key request. Input can be provided to the session key routing module from the key request processing module based upon information in the key request.

The examples disclosed herein are meant to illustrate and not limit the scope of the claimed invention. One of ordinary skill in the art will appreciate that the claims encompass more than these examples. For instance, a RPM Session Master Key (SMK) in some of the examples is a RPM 256-bit ID3 key value used between a browser and a server. However, any suitably-sized key can be used. Further, the RPM Session Master Key can be a symmetric (e.g., AES) key. One of skill in the art will recognize that the functions of the RPM Master Key can be performed using public/private key pairs. An OpenID can be analogous to a Session ID. In some of the examples, it is a random or pseudo-random 16-digit hex number that can be assigned either per session or for a longer term. It can be used to identify browser and server components. Any suitable length and format can be used for the OpenID. A Key Distribution Center (KDC) as used in the examples is a data store of RPM keys (SMKs) and the associated OpenIDs. However, a KDC can store additional data as well. An Authentication Handshake (AH) is a protocol whereby a browser may check and validate (verify) the identity of a web site (server). This process can help to establish a secure communications channel between browsers and servers that are untrusted to each other.

Normal Operation (Trusted) is the process by which a browser and server communicate securely after having established a trusted, keyed relationship, either by an AH or by an out-of-band distribution of SSLX keys. The out-of-band distribution may be of all or part of a key used in an embodiment of the present invention. An Authentication Request (AR) is the start of an Authentication Handshake and is generally sent from a browser to a web site server. It can contain information such as an SSF value, a browser-generated public key, a Directory Service/Server's ID, etc. A Security Setting Flag (SSF) can be a value sent as part of an AR that indicates the browser's configuration and set security level for Authentication Handshakes (e.g., High, Medium, Low, etc.)

The different options for each SSF code can indicate the reply method that should be implemented by the server and the DS.

Verified Set Up (VSU) is the process by which a browser and server validate (verify) their electronic identity to a Directory Service/Server (DS) for trusted third-party verification. This is generally a one-time only action, which may be performed at multiple DSs. It can also be reset at any DS that has already been verified. Each server should perform at least one VSU to any public DS or to the CDS. Browsers may perform this process, if desired. A Verified Set Up Request (VSUR) is the initial TCP request from a browser or web server that initiates the VSU process to a particular DS. Any suitable protocol other than TCP may be used.

A Directory Service/Server (DS) can be an entity that can act as a trusted switch by which browsers can verify the identity of a web server. The DS can help establish a trusted relationship between a browser and a web server. There can be any number of DSs. There can be a "root" DS that can maintain a list of the public DSs. The root can be called a Common DS (CDS). A DS Request (DSR) can be the initial TCP request sent by a browser to a DS that participates in an Authentication Handshake (AH). A DS Flag code (DSF) can be a value included in a VSUR that can indicates the browser's configuration and set the security level for VSU processing (e.g., High, Medium, Low, etc.) There are different options for each DSF value, each indicating a reply method from the DS. A DS Key (DSK) can be a RPM 256-bit ID3 key value used between a browser or server and a DS and can be obtained during a VSU.

What is claimed is:

1. A method for secure communications, comprising:
  receiving at a server an authentication request from a browser that includes a security setting flag, wherein
  if the security setting flag is a first value, then
  sending a session key to the browser, wherein the session key is encrypted using a public key of the browser;
  if the security setting flag is a second value, then
  receiving from the browser a list of directory servers;
  sending to the browser a first part of a session key encrypted using a public key of the browser;
  selecting a directory server from the list of directory servers;
  sending to the selected directory server a second part of the session key, said second part encrypted using a first key to be decrypted by the directory server and sent to the browser encrypted using a second key; and
  if the security setting flag is a third value, then
  sending to the directory server the session key encrypted with a first key to be sent to the browser encrypted using a second key.

2. The method of claim 1, wherein the authentication request further includes a public key of the browser.

3. The method of claim 1, wherein a new session key is generated and used once every n messages received at the server, where n is an integer.

4. The method of claim 1, wherein a new session key is generated and used for each web page sent from the server to the browser.

5. The method of claim 1, further comprising: Sending from a server a verified set up request to a directory server that includes a verified set up security setting flag, wherein if the flag is a first value, then receiving a directory server key encrypted using a public key of the server; and if the flag is a second value, then receiving a directory server key at an email address; and if the flag is a third value, then receiving a first part of a directory server key from the directory server over an HTTP connection and a second part of the directory server key at an email address.

6. The method of claim 5, wherein the verified set up request includes a domain name of the server and at least part of the directory server key is sent to an email address at the same domain name address.

* * * * *